US010800388B2

(12) United States Patent
Besier et al.

(10) Patent No.: US 10,800,388 B2
(45) Date of Patent: Oct. 13, 2020

(54) METHOD FOR OPERATING A BRAKE SYSTEM FOR MOTOR VEHICLES, AND BRAKE SYSTEM (71) Applicant: Continental Teves AG & Co. oHG, Frankfurt (DE)

(72) Inventors: Marco Besier, Bad Schwalbach (DE); Georg Roll, Frankfurt (DE); Sascha Gröger, Kelkheim (DE); Andreas Neu, Kuhardt (DE); Cristiano Hoffmann, Maintal (DE)

(73) Assignee: Continental Teves AG & Co. oHG (DE)

( * ) Notice: Subject to any disclaimer, the term of this patent is extended or adjusted under 35 U.S.C. 154(b) by 92 days.

(21) Appl. No.: 16/072,333

(22) PCT Filed: Feb. 20, 2017

(86) PCT No.: PCT/EP2017/053755
§ 371 (c)(1),
(2) Date: Jul. 24, 2018

(87) PCT Pub. No.: WO2017/144399
PCT Pub. Date: Aug. 31, 2017

(65) Prior Publication Data
US 2019/0071059 A1 Mar. 7, 2019

(30) Foreign Application Priority Data

Feb. 26, 2016 (DE) .................. 10 2016 203 115
Jan. 18, 2017 (DE) .................. 10 2017 200 752

(51) Int. Cl.
*B60T 8/40* (2006.01)
*B60T 8/26* (2006.01)
*B60T 8/48* (2006.01)

(52) U.S. Cl.
CPC ............ *B60T 8/266* (2013.01); *B60T 8/4072* (2013.01); *B60T 8/4081* (2013.01); *B60T 8/4872* (2013.01)

(58) Field of Classification Search
CPC ...... B60T 8/266; B60T 8/4081; B60T 8/4072; B60T 8/4872

(Continued)

(56) References Cited

U.S. PATENT DOCUMENTS 3,232,057 A    2/1966   Kersting
5,042,884 A * 8/1991   Farr .......................... B60T 8/00
                                                                 303/186

(Continued)

FOREIGN PATENT DOCUMENTS

CN    103287419 A    9/2013
CN    104742884 A    7/2015
(Continued)

OTHER PUBLICATIONS

German Search Report for German Application No. 10 2017 200 752.4, with partial translation, dated Nov. 23, 2017—11 pages.

(Continued)

*Primary Examiner* — Thomas W Irvin
(74) *Attorney, Agent, or Firm* — RatnerPrestia (57) ABSTRACT

A method for operating a motor vehicle brake installation. An electrically controllable pressure modulation device having a pump-valve arrangement is hydraulically arranged between the primary brake system and the front axle brakes. The pump-valve arrangement includes, for each front brake, a first valve, arranged between the inlet valve of the primary brake system and the brake, and an electrically activatable pump, with a suction and pressures ports. The pressure port is connected to the brake. In the presence of a predetermined condition of the primary brake system and of an actuation of (Continued)

the master brake cylinder by the driver, a build-up of brake pressure at the front axle brakes is performed by the pump-valve arrangement. The pressure set by the pump-valve arrangement is higher than the brake pressure in the master brake cylinder, whereas the brake pressure of the master brake cylinder prevails at the brakes of the rear axle.

18 Claims, 6 Drawing Sheets

(58) Field of Classification Search
USPC ...................................... 303/9.62, 186, 113.5
See application file for complete search history.

(56) References Cited

U.S. PATENT DOCUMENTS

| | | | | |
|---|---|---|---|---|
| 5,088,042 | A * | 2/1992 | Brearley | B60T 8/1766 |
| | | | | 701/70 |
| 6,193,331 | B1 | 2/2001 | Yonemura et al. | |
| 7,837,280 | B2 * | 11/2010 | Okano | B60T 8/266 |
| | | | | 303/113.5 |
| 8,781,701 | B2 * | 7/2014 | Aoki | B60T 1/10 |
| | | | | 303/138 |
| 8,915,554 | B2 * | 12/2014 | Sekiya | B60T 8/1764 |
| | | | | 303/149 |
| 8,915,555 | B2 | 12/2014 | Osaki et al. | |
| 8,998,347 | B2 | 4/2015 | Kunz et al. | |
| 9,205,824 | B2 | 12/2015 | Feigel et al. | |
| 9,381,901 | B2 | 7/2016 | Kobayashi et al. | |
| 9,827,960 | B2 * | 11/2017 | Feigel | B60T 8/4081 |
| 10,358,119 | B2 * | 7/2019 | Besier | B60T 8/885 |
| 10,391,994 | B2 * | 8/2019 | Drumm | B60T 8/4081 |
| 2004/0260446 | A1 | 12/2004 | Hamada et al. | |
| 2009/0315391 | A1 * | 12/2009 | Tanaka | B60T 8/4081 |
| | | | | 303/113.5 |
| 2013/0076116 | A1 * | 3/2013 | Sekiya | B60T 8/1764 |
| | | | | 303/149 |
| 2014/0152085 | A1 * | 6/2014 | Biller | B60T 8/441 |
| | | | | 303/10 |
| 2014/0346851 | A1 | 11/2014 | Sonoda et al. | |
| 2016/0339885 | A1 | 11/2016 | Linhoff et al. | |
| 2017/0129469 | A1 * | 5/2017 | Besier | B60T 13/686 |
| 2017/0282877 | A1 * | 10/2017 | Besier | B60T 17/002 |
| 2017/0361825 | A1 * | 12/2017 | Drumm | B60T 13/745 |
| 2019/0039583 | A1 * | 2/2019 | Besier | B60T 8/4872 |

FOREIGN PATENT DOCUMENTS

| | | |
|---|---|---|
| DE | 69722704 T2 | 4/2004 |
| DE | 102010002272 A1 | 8/2011 |
| DE | 112012004928 T5 | 9/2014 |
| DE | 102013224776 A1 | 6/2015 |
| DE | 102015212552 A1 | 1/2016 |
| DE | 102014216815 A1 | 2/2016 |
| DE | 102016203111 A1 | 9/2016 |
| KR | 20140023369 A | 2/2014 |
| WO | 2015074935 A1 | 5/2015 |
| WO | 2015106892 A1 | 7/2015 |
| WO | 2016096531 A1 | 6/2016 |
| WO | 2016139186 A1 | 9/2016 |

OTHER PUBLICATIONS

International Search Report and Written Opinion for International Application No. PCT/EP2017/053755, dated Apr. 24, 2017—13 pages.
Korean Notice of Grounds for Rejection for Korean Application No. 10-2018-7023160, dated Jul. 8, 2019 with translation, 18 pages.
Chinese Office Action for Chinese Application No. 201780010273.6, dated May 14, 2020 with translation, 18 pages.

* cited by examiner

METHOD FOR OPERATING A BRAKE SYSTEM FOR MOTOR VEHICLES, AND BRAKE SYSTEM

CROSS REFERENCE TO RELATED APPLICATIONS

This application is the U.S. National Phase Application of PCT International Application No. PCT/EP2017/053755, filed Feb. 20, 2017, which claims priority to German Patent Application No. 10 2016 203 115.5, filed Feb. 26, 2016 and German Patent Application No. 10 2017 200 752.4, filed Jan. 18, 2017, the contents of such applications being incorporated by reference herein.

FIELD OF THE INVENTION

The invention relates to a method for operating a brake installation and to a brake installation.

BACKGROUND OF THE INVENTION

DE 10 2015 212 552 A1, which is incorporated by reference herein, discloses a brake installation for a motor vehicle for actuating hydraulically actuatable wheel brakes of a front axle and of a rear axle, having a master brake system having a master brake cylinder which can be actuated by means of a brake pedal, having a pressure medium reservoir tank assigned to the master brake cylinder, having an electrically controllable pressure modulation device with one inlet and outlet valve for each wheel brake for the purposes of setting wheel-specific brake pressures, and having a first electrically controllable pressure provision device, and having a pump-valve arrangement, wherein the pump-valve arrangement is connected hydraulically between the inlet valves of the master brake system and the wheel brakes of front and rear axle. The master brake system performs the system pressure build-up in a normal operating mode, and the pump-valve arrangement is provided for the situation in which the system pressure provision function of the master brake system has failed. In this situation, the pump-valve arrangement performs the pressure build-up. More specific details regarding the operation of the brake installation are however not described.

SUMMARY OF THE INVENTION

An aspect of the present invention aims to provide a method for operating a brake installation for motor vehicles and a brake installation, which method/brake installation, in particular if the electrically controllable pressure provision of the master brake system has failed, permit a reliable braking operation, which is comfortable for the driver, in the event of a brake actuation by the driver. Here, it is the intention for the maximum braking potential, also of the rear axle, to be utilized, while simultaneously maintaining vehicle stability.

With regard to the method, an aspect of the invention is based on the concept that, in the presence of a predetermined condition of the primary brake system and of an actuation of the master brake cylinder by the vehicle driver, a build-up of wheel brake pressure at the wheel brakes of the front axle is performed by means of the pump-valve arrangement, wherein the pressure set by means of the pump-valve arrangement is higher than the brake pressure in the master brake cylinder, whereas the brake pressure of the master brake cylinder prevails at the wheel brakes of the rear axle. That is to say, the wheel brakes of the rear axle are connected to the master brake cylinder such that the brake pressure of the master brake cylinder prevails in the wheel brakes of the rear axle.

A method according to an aspect of the invention may for example also be carried out in a brake installation in which the pump-valve arrangement is connected hydraulically between the inlet valves of the primary brake system and the wheel brakes of front and rear axle, and comprises, for each of the wheel brakes of the front axle and also the wheel brakes of the rear axle, a first valve arranged between the corresponding inlet valve of the primary brake system and the wheel brake and an electrically activatable pump with a suction port and a pressure port, wherein the pressure port is connected to the wheel brake.

With regard to the brake installation, an aspect of the invention is based on the concept that the pump-valve arrangement comprises, only for each wheel brake of the front axle, a first valve arranged between the corresponding inlet valve of the primary brake system and the wheel brake and an electrically activatable pump with a suction port and a pressure port, wherein the pressure port is connected to the wheel brake. Since the master brake cylinder is connected to the wheel brakes of the rear axle, wherein said hydraulic connection is open or present in the electrically deenergized state of the brake installation, the brake pressure of the master brake cylinder prevails at the wheel brakes of the rear axle in the presence of an actuation of the master brake cylinder by the vehicle driver. In the presence of a predetermined condition of the primary brake system and of an actuation of the master brake cylinder by the vehicle driver, a build-up of wheel brake pressure at the wheel brakes of the front axle is performed by means of the pump-valve arrangement, wherein the pressure set by means of the pump-valve arrangement is higher than the brake pressure in the master brake cylinder.

An aspect of the invention offers the advantage of an improved braking action in relation to the passive hydraulic fall-back level in which the wheel brakes of front and rear axle are connected to the master brake cylinder and the brake pressure of the master brake cylinder prevails in all wheel brakes. At the same time, however, a known and acceptable brake pedal feel for the vehicle driver remains, because the master brake cylinder is connected to the rear-axle wheel brakes. A shorter and therefore more comfortable brake pedal travel in relation to the passive hydraulic fall-back level is advantageously realized for the vehicle driver, because, in the event of pressure modulation by the vehicle driver by means of the brake pedal, substantially only the rear-axle wheel brakes receive brake fluid from the master brake cylinder.

It is preferable for the first valve to in each case be designed to be open when electrically deenergized, in order to make it possible, in the event of a complete failure of the supply of electrical energy to the brake installation, for the vehicle driver to act on the wheel brakes of front and rear axle (passive hydraulic fall-back level). The first valve is particularly preferably activatable in analog fashion in each case.

It is preferable for the pump-valve arrangement to comprise, for each wheel brake of the front axle, a check valve which is connected in parallel with respect to the first valve and which opens in the direction of the wheel brake. It is hereby ensured that, in the situation in which the master brake cylinder pressure input by the vehicle driver is higher than the pressure generated by the pumps in the case of the first valves being closed, the higher pressure prevails at the front-axle wheel brakes.

Preferably, the pressure to be set at the front-wheel brakes by means of the pump-valve arrangement is determined by multiplication of the brake pressure of the master brake cylinder by a factor which is higher than one. The factor particularly preferably amounts to approximately two.

The brake pressure of the master brake cylinder is preferably determined by means of a first pressure detection device arranged in the pump-valve arrangement. A master brake cylinder pressure detection is thus ensured independently of the primary brake system. The first pressure detection device is advantageously arranged hydraulically upstream of one of the first valves, such that the pressure detection device detects an inlet pressure of the pump-valve arrangement.

It is preferable for in each case the pressure port of the pump to be connected directly to the wheel brake, that is to say for example without interposition of an actuatable valve or of an isolating piston. In this way, a back pressure, for example, is prevented.

In a preferred embodiment of the method according to an aspect of the invention or of the brake installation according to an aspect of the invention, in the presence of the predetermined condition of the primary brake system and of the actuation of the master brake cylinder by the vehicle driver, the first valves are closed and the build-up of wheel brake pressure at the wheel brakes of the front axle to a pressure value higher than the master brake cylinder pressure is performed by means of the pumps of the pump-valve arrangement. An outflow of pressure medium out of the master brake cylinder into the front-axle wheel brakes is thus prevented.

The predetermined condition of the primary brake system is preferably a failure of the pressure provision device of the primary brake system. Then, in the event of an actuation of the master brake cylinder by the vehicle driver, a build-up of wheel brake pressure at the front-axle wheel brakes is performed by means of the pump-valve arrangement, wherein the pressure set by means of the pump-valve arrangement is higher than the brake pressure in the master brake cylinder, whereas the brake pressure of the master brake cylinder prevails at the rear-axle wheel brakes.

In a preferred embodiment of the method according to an aspect of the invention or of the brake installation according to an aspect of the invention, for each pump, a pressure medium reservoir chamber is provided in the pump-valve arrangement. For the build-up of the pressure to be set by means of the pump-valve arrangement, pressure medium is drawn out of the pressure medium reservoir chambers, and conveyed into the wheel brakes of the front axle, by the pumps. The holding of pressure medium in the pump-valve arrangement itself increases the operational readiness and availability of the pump-valve arrangement. Boosting of the pressure for the front-axle wheel brakes can thus be reliably performed. In particular, it is thus possible to avoid insufficient pressure medium being available for the pump-valve arrangement when required owing to a leaking or destroyed hydraulic line to a separately arranged pressure medium reservoir tank of the brake installation.

The pressure medium reservoir chambers are preferably connected to a pressure medium reservoir tank which is assigned to the master brake cylinder and which is at atmospheric pressure. A replenishing flow of additional pressure medium from the pressure medium reservoir tank into the pressure medium reservoir chambers is thus possible. The pressure medium reservoir chambers are particularly preferably connected to the pressure medium reservoir tank via a single, that is to say common, tank port of the pump-valve arrangement. The number of hydraulic lines between pump-valve arrangement and primary brake system can thus be minimized.

For each pump (or for each wheel brake of the front axle), the suction port of the pump is preferably connected via a third valve to the associated pressure medium reservoir chamber, wherein, for the build-up of the pressure to be set by means of the pump-valve arrangement, the first valves are closed and the third valves are opened. The third valve is particularly preferably designed to be closed when electrically deenergized.

For each wheel brake of the front axle (or for each pump), it is preferable for a second valve to be provided in the pump-valve arrangement, which second valve is arranged in a hydraulic connection between the wheel brake and the pressure medium reservoir chamber. A pressure dissipation at one of the wheel brakes of the front axle is performed by virtue of the second valve being opened. The second valve is particularly preferably designed to be closed when electrically deenergized, in order to make it possible, in the event of a failure of the electrical energy supply of the brake installation, for the vehicle driver to build up brake pressure in the wheel brake.

It is preferable if, for each wheel brake of the front axle, a second pressure detection device is provided in the pump-valve arrangement, which pressure detection device detects the pressure at the wheel brake. The wheel pressure in the wheel brakes of the front axle can thus be set or adjusted to in a wheel-specific manner on the basis of the second pressure detection devices.

It is preferable if, for as long as no anti-lock control operation is active, in the presence of the predetermined condition of the primary brake system and of the actuation of the master brake cylinder by the vehicle driver, the build-up of wheel brake pressure at the front axle wheel brakes is performed by means of the pump-valve arrangement, wherein the pressure set is higher than the brake pressure in the master brake cylinder.

In one refinement of an aspect of the invention, in the presence of the predetermined condition of the primary brake system and of the actuation of the master brake cylinder by the vehicle driver, by means of the pump-valve arrangement, an anti-lock control operation is performed only at the wheel brakes of the front axle, wherein an ABS pressure demand is predetermined for each of the front axle wheel brakes. It is thus possible for the pressure to be set by means of the pump-valve arrangement (factor) to be selected to be higher, and nevertheless for the maximum braking potential of the rear axle to be utilized.

The pressure at one of the wheel brakes of the front axle is preferably set to the predetermined ABS pressure demand for as long as the ABS pressure demand of the wheel brake is higher than the brake pressure in the master brake cylinder. The pressure set at the wheel brake is in this case particularly preferably always higher, by a predefined amount, than the brake pressure in the master brake cylinder.

The pressure at one of the wheel brakes of the front axle is preferably set to the brake pressure in the master brake cylinder if the ABS pressure demand of the wheel brake is lower than the brake pressure in the master brake cylinder.

In this way, limited ABS control at the front axle is realized for driver-imparted braking operations in the fallback level. This leads to reliable braking.

The brake installation preferably comprises a first electronic open-loop and closed-loop control unit assigned to the primary brake system.

The hydraulic components of the pump-valve arrangement are preferably designed as an independent assembly, wherein the assembly is assigned a second electronic open-loop and closed-loop control unit, which is arranged on the assembly.

BRIEF DESCRIPTION OF THE DRAWINGS

Further preferred embodiments of aspects of the invention will emerge from the claims and the following description with reference to figures.

In the figures, in each case schematically.

DETAILED DESCRIPTION OF THE PREFERRED EMBODIMENTS

Figure 1:
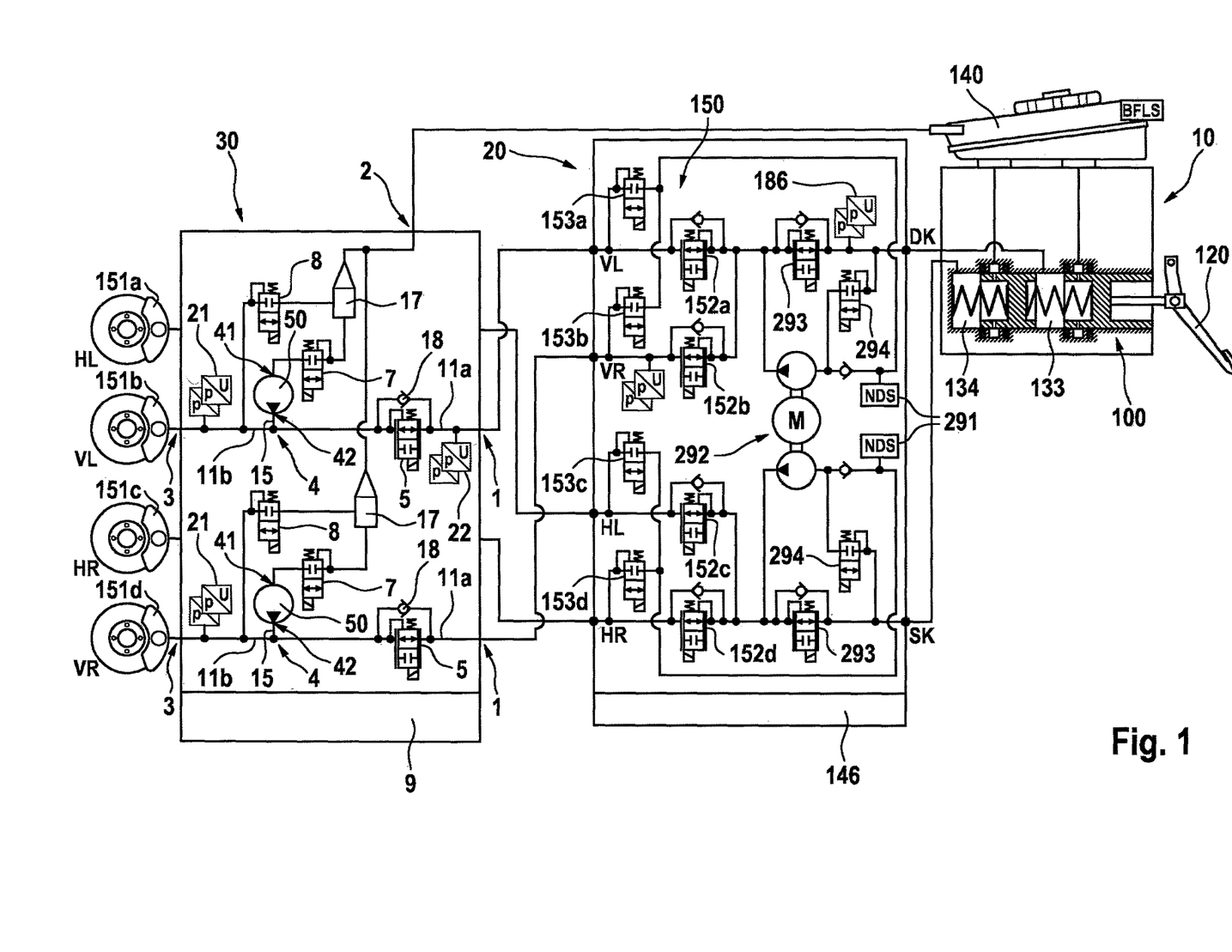
FIG. 1 shows a first exemplary brake installation for carrying out a method according to an aspect of the invention.

FIG. 1 schematically illustrates a first exemplary brake installation of a motor vehicle for carrying out a method according to an aspect of the invention. The brake installation comprises a master brake system 10, 20 (primary brake system for service braking operations) and an electrically controllable pump-valve arrangement (for example a pump-valve module) 30 (secondary brake system for service braking operations).

The master brake system comprises substantially a brake actuation means 10 with master brake cylinder 100 and a conventional ESC module 20 (with an electrically controllable pressure provision device), which is assigned a first electronic open-loop and closed-loop control unit 146.

In the example, the brake actuation means 10 comprises a master brake cylinder 100, which can be actuated by means of a brake pedal 120 and which has pressure spaces 133 and 134, wherein each pressure space 133 and 134 is assigned the wheel brakes of an axle 151b, 151d (front axle VA) and 151a, 151c (rear axle HA) respectively, and a pressure medium reservoir tank 140 which is assigned to the master brake cylinder and which is at atmospheric pressure. The wheel brake 151b is assigned to the left-hand front wheel VL, and the wheel brake 151d is assigned to the right-hand front wheel VR, and said wheel brakes are assigned to the brake circuit of the first master brake cylinder pressure space 133. The wheel brake 151a is assigned to the left-hand rear wheel HL, and the wheel brake 151c is assigned to the right-hand rear wheel HR, and said wheel brakes are assigned to the brake circuit of the second master brake cylinder pressure space 134.

ESC module 20 comprises a two-circuit motor-pump assembly 292, with a low-pressure accumulator 291 and with two electrically controllable valves 293, 294 for each circuit, and also an electrically controllable pressure modulation device 150, with an inlet valve 152a-152d and with an outlet valve 153a-153d for each wheel brake for the purposes of setting wheel-specific brake pressures for the wheel brakes 151a-151d.

Pump-valve arrangement 30 is assigned a second electronic open-loop and closed-loop control unit (ECU) 9.

Pump-valve arrangement 30 is arranged hydraulically between the ESC module 20 and the wheel brakes of the front axle VA, that is to say the wheel brake 151b of the left-hand front wheel VL and the wheel brake 151d of the right-hand front wheel VR. That is to say, arrangement 30 is arranged downstream of the corresponding inlet valves 152a, 152b.

The wheel-specific outlet ports of the master brake system are connected to the hydraulically actuatable wheel brakes 151a-151d of the front and rear axle, wherein the inlet valves 152c, 152d of the rear-axle wheel brakes are connected directly to the rear-axle wheel brakes 151a, 151c, and the inlet valves 152a, 152b of the front-axle wheel brakes are connected to the front-axle wheel brakes 151b, 151d via the pump-valve arrangement 30.

Pump-valve arrangement 30 is of two-circuit design. For each circuit, the arrangement comprises a first port 1 (inlet pressure port, pressure inlet) for connection to the master brake system and a third port 3 (outlet pressure port, pressure outlet) for connection to the corresponding front wheel brake 151b, 151d. Arrangement 30 comprises a (single) second port 2 (tank port) for connection to the pressure medium reservoir tank 140.

For each circuit, arrangement 30 comprises a pump 50 with a suction side 41 and with a pressure side 42.

The exemplary two-circuit arrangement 30 thus comprises a pump arrangement 4 with two pumps 50, that is to say a single pump 50 for each circuit. The two pumps 50 of the pump arrangement 4 are driven jointly by one electric motor M (not illustrated in any more detail). Each pump 50 comprises a suction side 41 and a pressure side 42. One of the circuits of the arrangement will be described below; the other circuit is of corresponding construction.

For each circuit, arrangement 30 comprises an electrically actuatable first valve 5 arranged between inlet pressure port 1 and outlet pressure port 3. In the example, valve 5 is designed to be open when electrically deenergized, and activatable in analogue fashion.

The first valve 5 is arranged in a hydraulic connection 11 between the inlet pressure port 1 and the outlet pressure port 3 with a line section 11a (at the inlet pressure port side) and a line section 11b (at the outlet pressure port side). A check valve 18 which opens in the direction of the outlet pressure port 3 is connected in parallel with respect to the valve 5.

The pressure side 42 of the pump 50 is connected via a line section 15 to the associated line section 11b and thus to the associated outlet pressure port 3.

Line section 11b is furthermore connected via a second valve 8 (also referred to as dissipation valve), which is advantageously closed when electrically deenergized, to a pressure medium reservoir chamber 17 of the arrangement 30.

The suction side 41 of the pump 50 is connected to the pressure medium reservoir chamber 17 via a line section in which there is arranged a third valve 7 (so-called pump valve) which is advantageously closed when electrically deenergized.

Pressure medium reservoir chamber 17 is connected via a replenishment line to the second port 2 (tank port).

In the example, the replenishment lines of the pressure medium reservoir chambers 17 are connected together and are jointly connected to the tank port 2.

In the exemplary embodiment, arrangement 30 comprises a (single) pressure detection device (for example pressure sensor) 22 which detects the pressure at one of the inlet pressure ports 1. The pressure is preferably detected at the inlet pressure port 1 of the brake circuit assigned to the first pressure space of the master brake cylinder.

In the exemplary embodiment, arrangement 30 comprises, for each circuit or each front wheel brake, a pressure detection device (pressure sensor) 21 which detects the pressure at the outlet pressure port 3, that is to say the respective wheel brake pressure.

The second electronic open-loop and closed-loop control unit (ECU) 9 is designed for actuating the pump arrangement 4 and the valves 5, 7, 8. The signals of the pressure detection devices 22, 21 are fed to the ECU 9.

Figure 2:
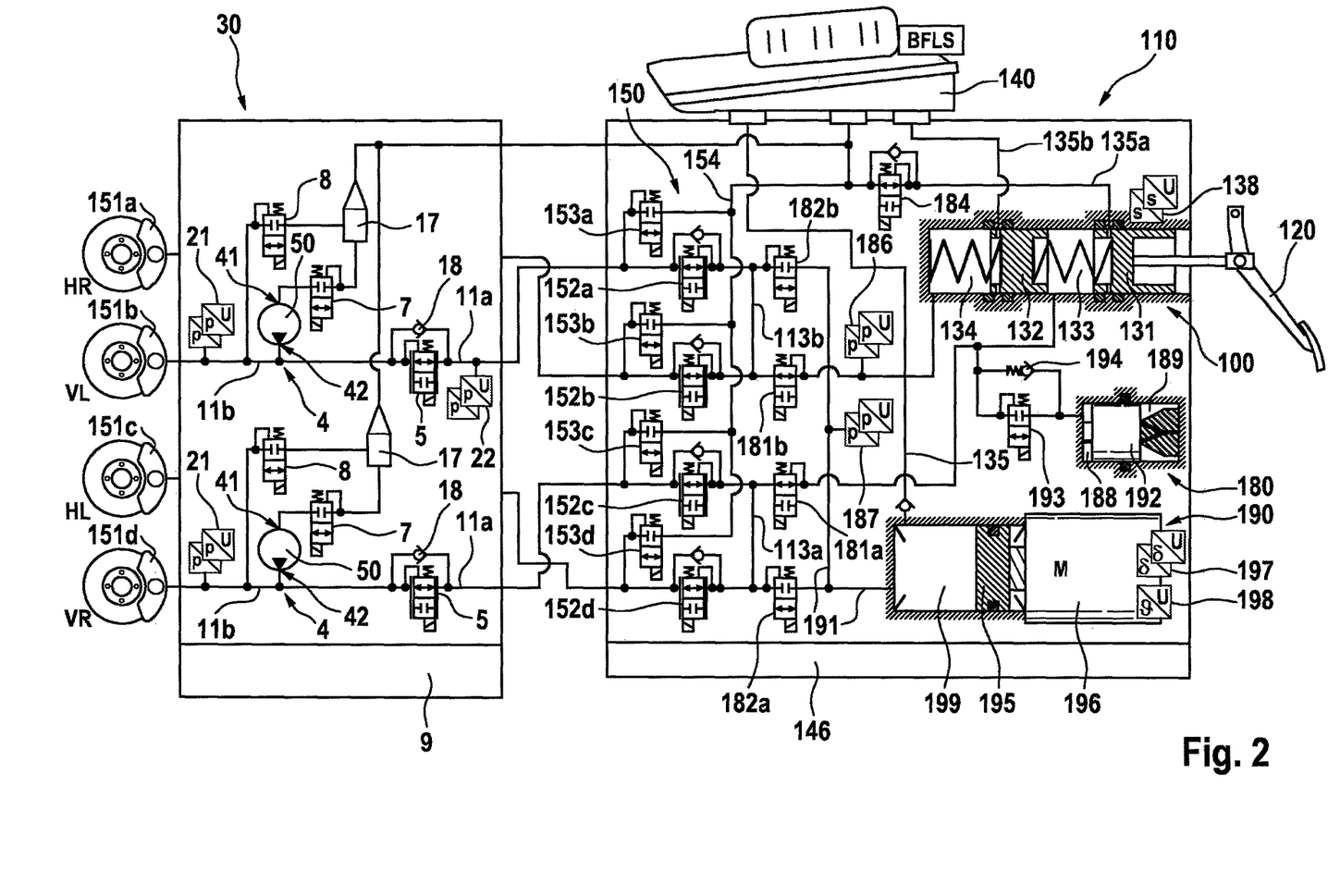
FIG. 2 shows a second exemplary brake installation for carrying out a method according to an aspect of the invention.

FIG. 2 schematically illustrates a second exemplary brake installation of a motor vehicle for carrying out a method according to an aspect of the invention. The brake installation comprises a master brake system 110 (primary brake system for service braking operations) and an electrically controllable pump-valve arrangement 30 (secondary brake system for service braking operations), the latter being constructed similarly to the pump-valve arrangement of FIG. 1.

Master brake system 110 constitutes a simulator brake installation having substantially a master brake cylinder 100, which is directly actuatable by means of a brake pedal 120 via a pressure rod, having a pressure medium reservoir tank 140, which is assigned to the master brake cylinder 100 and which is at atmospheric pressure, having a (travel) simulation device 180, which interacts with the master brake cylinder 100, having a (first) electrically controllable pressure provision device 190, having an electrically controllable pressure modulation device 150 for setting wheel-specific brake pressures for the wheel brakes 151a-151d, and having a first electronic open-loop and closed-loop control unit (ECU) 146, which is designed for actuating the pressure provision device 190 and the pressure modulation device 150.

The two-circuit master brake cylinder 100 comprises two pistons 131, 132 arranged in series, which delimit two hydraulic pressure spaces 133, 134. The first piston 131 is mechanically coupled to the brake pedal and is actuated directly by the vehicle driver without the interposition of a brake booster. The pressure spaces 133, 134 are assigned pressure equalization lines 135a, 135b to the pressure medium reservoir tank 140. A normally open (NO) diagnostic valve 184 is contained in the pressure equalization line 135a.

To detect an actuation of the master brake cylinder 100, a travel sensor 138, which is advantageously of redundant design, is provided, which travel sensor detects for example a displacement of the piston 131 and/or 132.

Pressure sensor 186 detects the pressure built up in the pressure chamber 134 as a result of a displacement of the second piston 132.

Pressure modulation device 150 comprises wheel-specific inlet valves 152a-152d and outlet valves 153a-153d.

The inlet ports of the inlet valves 152a-152d are supplied, via brake circuit supply lines 113a, 113b, with pressures which, in a first operating mode (for example "brake-by-wire"), are derived from a system pressure present in a system pressure line 191 connected to the pressure provision device 190. The hydraulic connection between the system pressure line 191 and the brake circuit supply line 113a, 113b can be shut off by means of an activation valve 182a, 182b, which is advantageously designed to be closed when electrically deenergized, for each brake circuit. In a second operating mode (fall-back operating mode), the brake circuit supply lines 113a, 113b are connected to the associated master brake cylinder pressure space 133, 134 by means of an isolating valve 181a, 181b, which is advantageously open when electrically deenergized, for each brake circuit. The outlet ports of the outlet valves 153a-153d are connected to the pressure medium reservoir tank 140 via a common return line 154.

In the example, the wheel brakes 151c and 151d are assigned to the left-hand rear wheel HL and to the right-hand front wheel VR and to the brake circuit supply line 113a, and the wheel brakes 151a and 151b are assigned to the right-hand rear wheel HR and to the left-hand front wheel VL and to the brake circuit supply line 113b. Other brake circuit distributions are conceivable.

Simulation device 180 is hydraulically couplable to the master brake cylinder 100 and is composed substantially of a simulator chamber 188, a simulator spring chamber 189 and a simulator piston 192 which separates the two chambers from one another. Simulator piston 192 is supported on the housing by an elastic element (e.g. a spring), which is arranged in simulator spring chamber 189 and which is advantageously preloaded. The simulator chamber 188 can be connected to the pressure space 133 of the master brake cylinder 100 by means of an electrically actuatable simulator enable valve 193. When a pedal force is input and simulator enable valve 193 is activated, pressure medium flows from the master brake cylinder pressure space 133 into the simulator chamber 188. A check valve 194 arranged hydraulically antiparallel with respect to the simulator enable valve 193 allows the pressure medium to flow back from the simulator chamber 188 to the master brake cylinder pressure chamber 133 substantially unhindered, irrespective of the switching state of the simulator enable valve 193.

The electrically controllable pressure provision device 190 is designed as a hydraulic cylinder-piston arrangement or a single-circuit electrohydraulic actuator, the piston 195 of which can be actuated by a schematically indicated electric motor 196 via a likewise schematically illustrated rotation/translation mechanism. A merely schematically indicated rotor position sensor which serves to detect the rotor position of the electric motor 196 is denoted by reference designation 197. In addition, use may also be made of a temperature sensor 198 for detecting the temperature of the motor winding. The piston 195 delimits a pressure space 199, which is connected to the system pressure line 191. Additional pressure medium can be drawn into the pressure space 199 by retraction of the piston 195 while the activation valves 182a, 182b are closed, by virtue of the fact that pressure medium can flow out of the tank 140 into the actuator pressure space 199 via a replenishment line 135 which has a check valve (not designated in any more detail) which opens in a flow direction to the actuator 190. To detect the pressure prevailing in the system pressure line 191, a pressure sensor 187 of preferably redundant design is provided.

Pump-valve arrangement 30 is arranged hydraulically between the master brake system 110, more specifically the electrically controllable pressure modulation device 150, and the wheel brakes of the front axle, that is to say the wheel brake 151b of the left-hand front wheel VL and the wheel brake 151d of the right-hand front wheel VR. That is to say, arrangement 30 is connected downstream of the corresponding inlet valves 152a, 152c. The wheel-specific outlet ports of the master brake system 110 are connected to the hydraulically actuatable wheel brakes 151a-151d of the front and rear axle, wherein the inlet valves 152b, 152d of the rear-axle wheel brakes are connected directly to the rear-axle wheel brakes 151a, 151c, and the inlet valves 152a, 152c of the front-axle wheel brakes are connected to the front-axle wheel brakes 151b, 151d via the pump-valve arrangement 30.

The hydraulic components of the brake installation are, in the example, arranged in two hydraulic units (modules). Each hydraulic unit is assigned an electronic open-loop and closed-loop control unit 146, 9.

It is preferable for each of the electronic open-loop and closed-loop control units 146, 9 to be supplied from a dedicated electrical energy supply.

In particular in the case of electrically boosted brake installations, it must be ensured that adequate availability is provided. High availability is preferably achieved by virtue of the brake installation being supplied from at least two mutually independent electrical energy sources. Furthermore, the components that are put at risk by possible failures, such as ECUs and actuators (in particular electrically controllable pressure provision devices), are preferably of redundant design.

A master brake system known per se preferably performs the build-up of system pressure during normal braking operation, and a pump-valve arrangement is provided for the situation in which the system pressure provision function of the master brake system has failed. In this situation, the pump-valve arrangement performs the pressure build-up. The pump-valve arrangement may both hydraulically boost a driver-imparted braking action and build up a driver-independent pressure.

The described pump-valve arrangement 30 (for example the pump-valve module) is advantageously used in addition to a primary brake system which already comprises an electrically controllable pressure provision device. The pump-valve module advantageously comprises the second ECU required for redundancy and a second electrically controllable pressure provision device, such that two independent ECUs and two independent electrically controllable pressure provision devices are provided in the brake installation.

Pump-valve arrangement 30 may be connected downstream of any desired hydraulic primary brake system. For example, it may, as illustrated in FIG. 1, be connected downstream of a conventional brake system comprising an actuation means and a standard ESC. Furthermore, it may, as illustrated by way of example in FIG. 2, be connected downstream of a simulator brake system.

The brake installations have in common the fact that, in the so-called passive hydraulic fall-back level, if for example the electrically controlled pressure build-up function of the primary brake system has failed, the brake pressure generated in the master brake cylinder 100 by the vehicle driver is transmitted to the wheel brakes 151a-d of front axle and rear axle. An aspect of the invention takes effect here to improve the braking performance.

Figure 3:
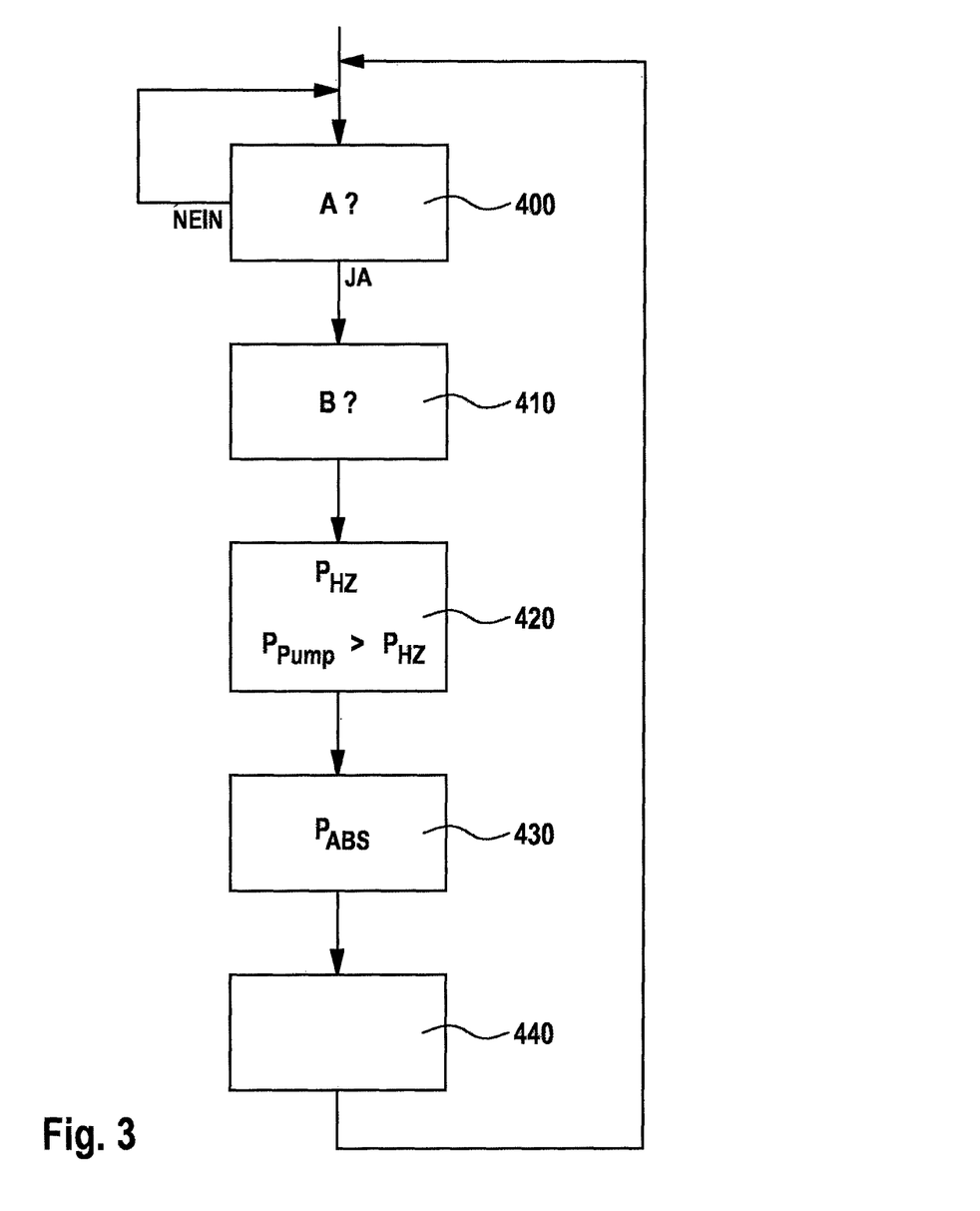
FIG. 3 shows a flow diagram for illustrating an exemplary method.

A highly schematic flow diagram for illustrating an exemplary method is illustrated in FIG. 3. Firstly, in block 400, it is checked whether a predetermined condition A of the primary brake system is present. In particular, in block 400, it is checked whether the pressure provision device of the primary brake system has failed, or whether no electrically controlled pressure build-up is possible by means of the primary brake system for some other reason. If this is the case, then in block 410, it is monitored whether a condition B, specifically an actuation of the master brake cylinder 100 by the vehicle driver, is present. If this is the case, then in block 420, the brake pressure $P_{HZ}$ in the master brake cylinder 100 is determined, for example by means of the pressure sensor 22. A build-up of wheel brake pressure at the wheel brakes 151b, 151d of the front axle VA is then performed by means of the pump-valve arrangement 30. The pump-valve arrangement is activated such that the pressure $P_{pump}$ set at the wheel brakes 151b, 151d is higher than the brake pressure in the master brake cylinder $P_{HZ}$. The brake pressure $P_{HZ}$ of the master brake cylinder however prevails at the wheel brakes 151a, 151c of the rear axle HA. Thus, an increase of the driver-imparted brake pressure is provided only for the front-axle wheel brakes 151b, 151d.

Thus, in the event of a failure of the primary brake system, the braking performance for pedal-actuated driver-imparted braking operations is improved in relation to the passive hydraulic fall-back level, by virtue of pressure boosting of the generated driver-imparted brake pressure being performed by means of the pump-valve arrangement 30.

In the example, to realize the pressure increase of the pressure generated by the driver in the master brake cylinder 100, in block 420, the master brake cylinder pressure imparted by the driver is detected at the inlet pressure sensor 22 of the pump-valve arrangement 30 and is boosted or increased by a suitable factor. For this purpose, in the pump-valve arrangement 30, the first valves 5 are closed and the third valves 7 are opened, and, by means of the pumps 50, brake fluid is drawn out of the pressure medium reservoir chambers 17 or the tank connecting line and of the pressure medium reservoir tank 140 of the primary brake system and is conveyed into the wheel brakes 151b, 151d of the front axle VA. In this way, an elevated pressure builds up in the front-axle wheel brakes.

Here, it is thus the case that, by means of the pump-valve arrangement 30, at the wheel brakes 151b, 151d of the front wheels, a brake pressure $P_{pump}$ is set which is higher than that generated in the master brake cylinder 100 by the driver. The brake pressure may be boosted or increased by any desired factor in relation to the driver-imparted master brake cylinder pressure $P_{HZ}$.

If the driver reduces the master brake cylinder pressure $P_{HZ}$ by means of the brake pedal again, then the pressure in the wheel brakes 151b, 151d of the front wheels is correspondingly also reduced again by the pump-valve arrangement 30. This takes place in the example by means of the second valves 8, which discharge pressure medium back into the reservoir chambers 17 or the tank connecting line and the pressure medium reservoir tank 140. Here, the respective wheel brake pressure can be measured by means of the wheel circuit pressure sensors 21. Since the stated valves, pumps and sensors are provided for each wheel brake circuit, a different pressure can be set for each wheel if desired. The wheel circuit pressure sensors 21 may furthermore be utilized for more exact closed-loop control of the wheel brake pressure.

In the exemplary method, as soon as the pressure in the front wheel brakes 151b, 151d is higher than the master brake cylinder pressure $P_{HZ}$, no further pressure medium volume flows from the master brake cylinder 100 into the front-wheel brake circuits, because a higher pressure prevails in said wheel brake circuits as far as the first valves 5. Therefore, if the driver modulates the pressure in the master brake cylinder 100 by means of the brake pedal 120, the pressure medium thus flows only into the wheel brakes 151a, 151c of the rear wheels HR, HL or rear axle HA. Thus, in this time, the pedal haptics are generated only by the wheel brakes 151a, 151c of the rear axle. In this way, a shorter brake pedal travel in relation to the passive hydraulic fall-back level is set. This is haptically advantageous for the driver because he or she does not need to actuate the brake pedal to such a great extent in order to achieve the same vehicle deceleration. Here, it is thus possible to generate a high brake pressure in the front wheel brakes 151b, 151d without utilizing a large pressure medium volume from the master brake cylinder 100, because the major part of the pressure medium volume for generating pressure in the front-wheel brakes 151b, 151d is drawn in from the reservoir chambers 17 or the tank 140.

Figure 4:
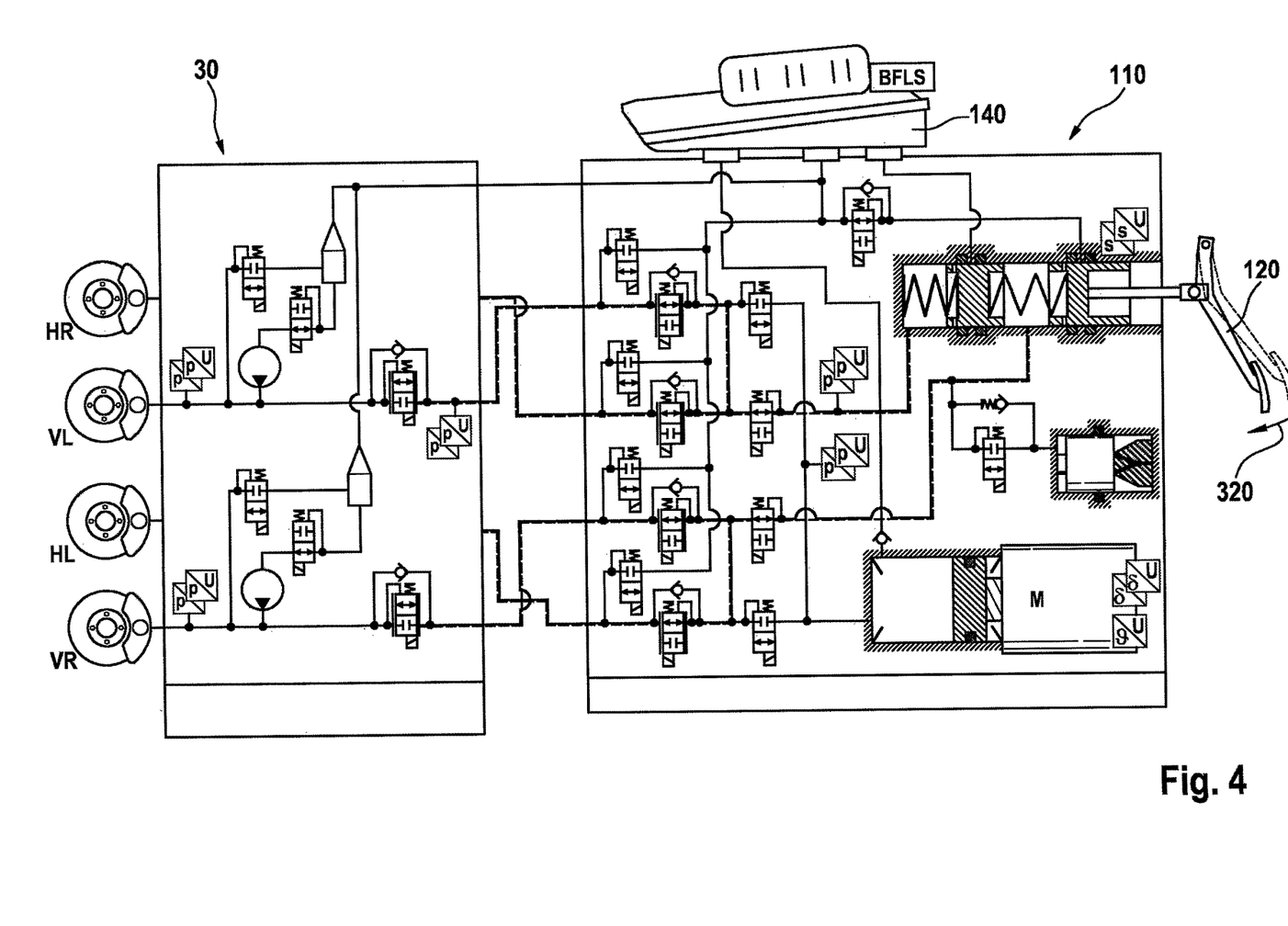
FIG. 4 is an illustration of a pressure-increasing function according to an exemplary method.

FIG. 4 illustrates, on the basis of the second exemplary brake installation, a pressure-increasing function in the event of a driver-imparted actuation (indicated by the arrow 320) in accordance with an exemplary method. The solid lines illustrate the pressure ($P_{pump}$) increased by means of the arrangement 30, and the dashed lines illustrate the pressure ($P_{HZ}$) input by the driver.

The factor for the increase of the driver-imparted pressure preferably amounts to approximately two. The factor may however also be variable during operation, and may self-evidently be adapted in accordance with the vehicle and brake system configuration.

The higher the factor for the pressure increase at the front axle VA, the more intense the vehicle deceleration that the driver can generate with the same brake pedal actuation force. A high pressure increase factor is thus advantageous in order to achieve an intense vehicle deceleration with a relatively low brake pedal actuation force.

There is however a conflict of aims here with regard to the brake force distribution of the vehicle, that is to say the brake force distribution between front axle VA and rear axle HA. The higher the pressure increase factor is selected to be, the more intensely the front axle VA is braked in relation to the rear axle HA. In the case of a high boost factor, this thus has the effect that the traction limit of the front wheels is reached early at the front axle, and the front axle thus locks up particularly early in relation to the rear axle. Thus, although the desired locking-up sequence of the axles is adhered to (front axle should lock up before the rear axle), this has the disadvantage, if a large pressure increase is selected for the front-axle wheel brakes 151b, 151d, that the rear axle does not exploit its full braking force potential, because said rear axle is in this case considerably underbraked in relation to the front axle. Indeed, only the non-boosted master brake cylinder pressure $P_{HZ}$ generated directly by the driver acts at the rear-axle wheel brakes 151a, 151c.

In order, in the case of a large pressure increase being selected for the front-axle wheel brakes 151b, 151d, to utilize the maximum braking force potential at the rear axle HA as effectively as possible, provision is made in the example, in block 430, for (limited) ABS control at the wheel brakes 151b, 151d of the front axle VA to be performed for driver-imparted braking operations in the fall-back level. Based on the slip of the front wheels, for each front-wheel brake 151b, 151d, an ABS pressure demand $P_{ABS}$ of the wheel brake is determined, and an anti-lock control operation is performed. Further details regarding this ABS control will be discussed in more detail on the basis of FIGS. 5 and 6.

If it has been identified in block 440 that the braking operation by the driver has been ended, then the exemplary method is ended.

Figure 5:
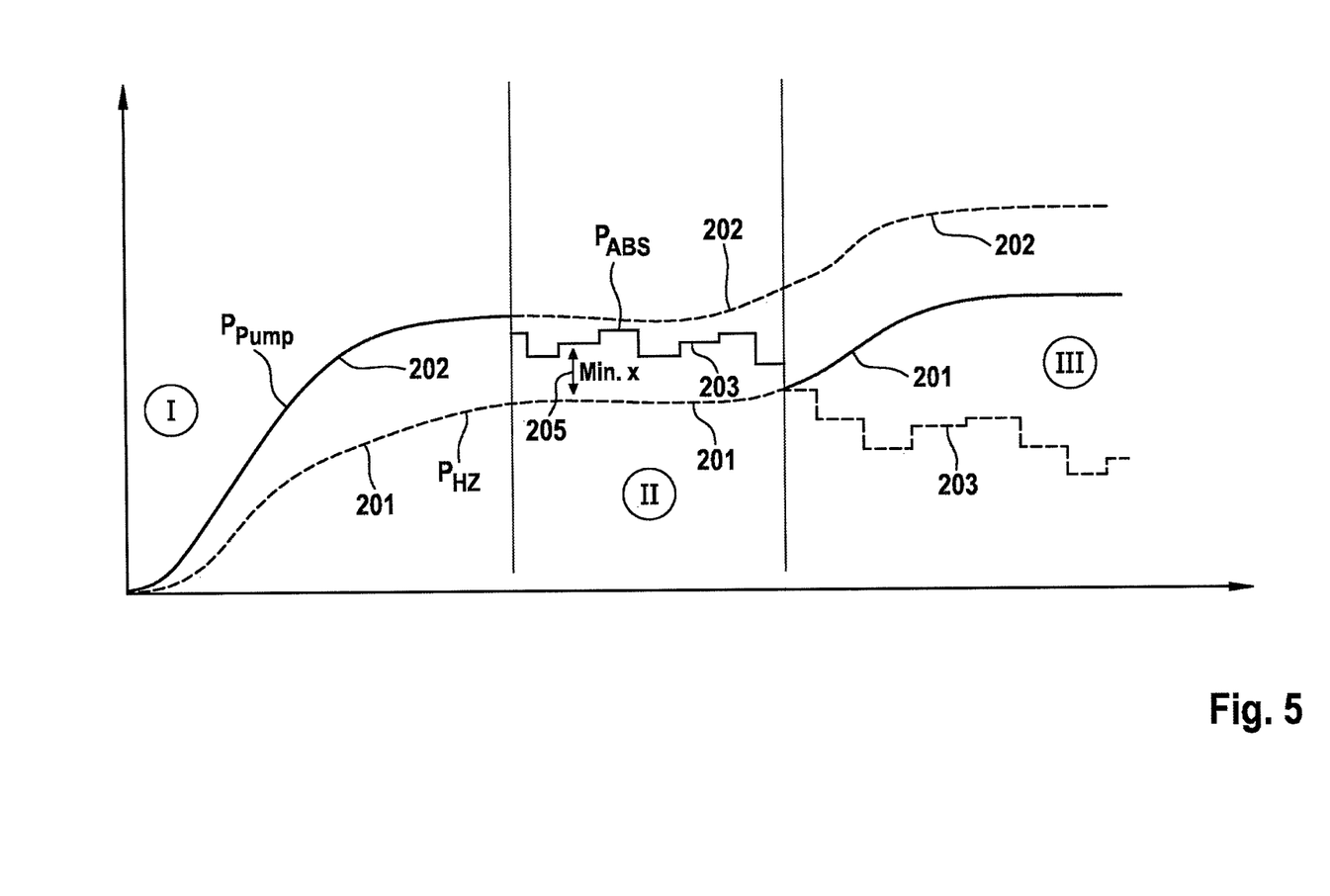
FIG. 5 shows profiles with respect to time of different variables during an exemplary method.

FIG. 5 shows exemplary profiles of different variables during an exemplary method. In particular, FIG. 5 illustrates, in principle, the functioning of exemplary ABS control for driver-imparted braking operations in the fall-back level.

The profile of the (non-boosted) master brake cylinder pressure $P_{HZ}$ (driver-imparted pressure, driver pressure request) is illustrated by the line 201. Line 202 illustrates the profile of the (boosted) pressure $P_{pump}$ (for the front-axle wheel brakes) to be set in principle by means of the pump-valve arrangement (outside ABS control), which pressure is higher, by a pressure increase factor (factor), than the master brake cylinder pressure $P_{HZ}$ (gain pressure request, that is to say gain pressure req=driver pressure req*factor, $P_{pump}=P_{HZ}$*factor). The profile of an ABS pressure demand $P_{ABS}$ of a front-axle wheel brake is illustrated by the line 203.

The section I represents for example a driver-initiated braking operation in the case of failure of the electrically controlled pressure provision device 292, 190 of the primary brake system and execution of a method according to an aspect of the invention. On the basis of the master brake cylinder pressure $P_{HZ}$ (dashed line 201) input by the driver and the predefined pressure increase factor (factor), the pressure $P_{pump}$ to be set at the front-axle wheel brakes is determined and is set at the wheel brake of the front axle by means of the pump-valve arrangement 30 (solid line 202). This takes place for as long as no anti-lock control operation is present.

In section II, an anti-lock control operation is active, wherein the ABS pressure demand $P_{ABS}$ for the front-axle wheel brake is always higher than the brake pressure in the master cylinder $P_{HZ}$. The wheel brake pressure of the front-axle wheel brake is then set in accordance with the ABS pressure demand $P_{ABS}$ (solid line 203) in order to prevent a lock-up of the front wheels.

In section III, an anti-lock control operation is active, wherein the ABS pressure demand $P_{ABS}$ falls below the master brake cylinder pressure $P_{HZ}$. If the wheel brake pressure control of the pump-valve arrangement 30 were to implement this ABS pressure demand, the front-wheel brake pressure would fall below the master brake cylinder pressure. Thus, pressure medium volume would flow out of the master brake cylinder 100 via the first valve 5 or the check valve 18, connected in parallel, of the pump-valve arrangement 30 into the wheel brake circuit, and would be discharged to the tank 17 or 140 by repeated opening of the dissipation valve 8. Thus, the pressure medium volume would gradually be discharged out of the master brake cylinder 100 to a tank, and the brake pedal 120 would sink. In the example, this is prevented, as illustrated in section III, in that the wheel pressure control does not follow the ABS pressure demand $P_{ABS}$ (line 203), but rather the setpoint variable for the wheel brake pressure controller is downwardly limited to the master brake cylinder pressure $P_{HZ}$, that is to say the master brake cylinder pressure is implemented in the front-wheel brake circuit (solid line 201). This means that the wheel brake pressure at the wheel brakes 151b, 151d of the front axle VA is set by means of the pump-valve arrangement 30, wherein the pressure set by means of the pump-valve arrangement is equal to the brake pressure in the master brake cylinder. This takes place with first valves 5 closed and by means of suitable activation of the pumps 50 of the pump-valve arrangement 30.

The exemplary operating method of the described limited ABS control thus permits limited slip control at the front axle and therefore prevents a relatively early lock-up of the front wheels in relation to the rear wheels. Therefore, a problem of an excessively high pressure increase factor is possibly eliminated or alleviated, and the conflict of aims with regard to a desired high pressure increase factor for the driver, in order to easily realize an intense vehicle deceleration, versus a front axle being greatly overbraked in relation to the rear axle is resolved or greatly alleviated.

In the example, the locking-up sequence or the overbraking of the front axle VA is controlled in targeted fashion by means of the value of the pressure increase. As indicated in FIG. 5, section II, by the vertical double arrow 205 (with the label "Min. x"), a front-wheel brake pressure which is higher than the master brake cylinder or rear-axle brake pressure by x bar is maintained in order to ensure that the front axle VA locks up before the rear axle HA. This may be necessary or advantageous in particular in the case of front-heavy vehicles with a low Z-critical value (threshold value which indicates a maximum braking action in the case of which a traction load on the front axle of the vehicle and a traction load on the rear axle of the vehicle are equal).

Figure 6:
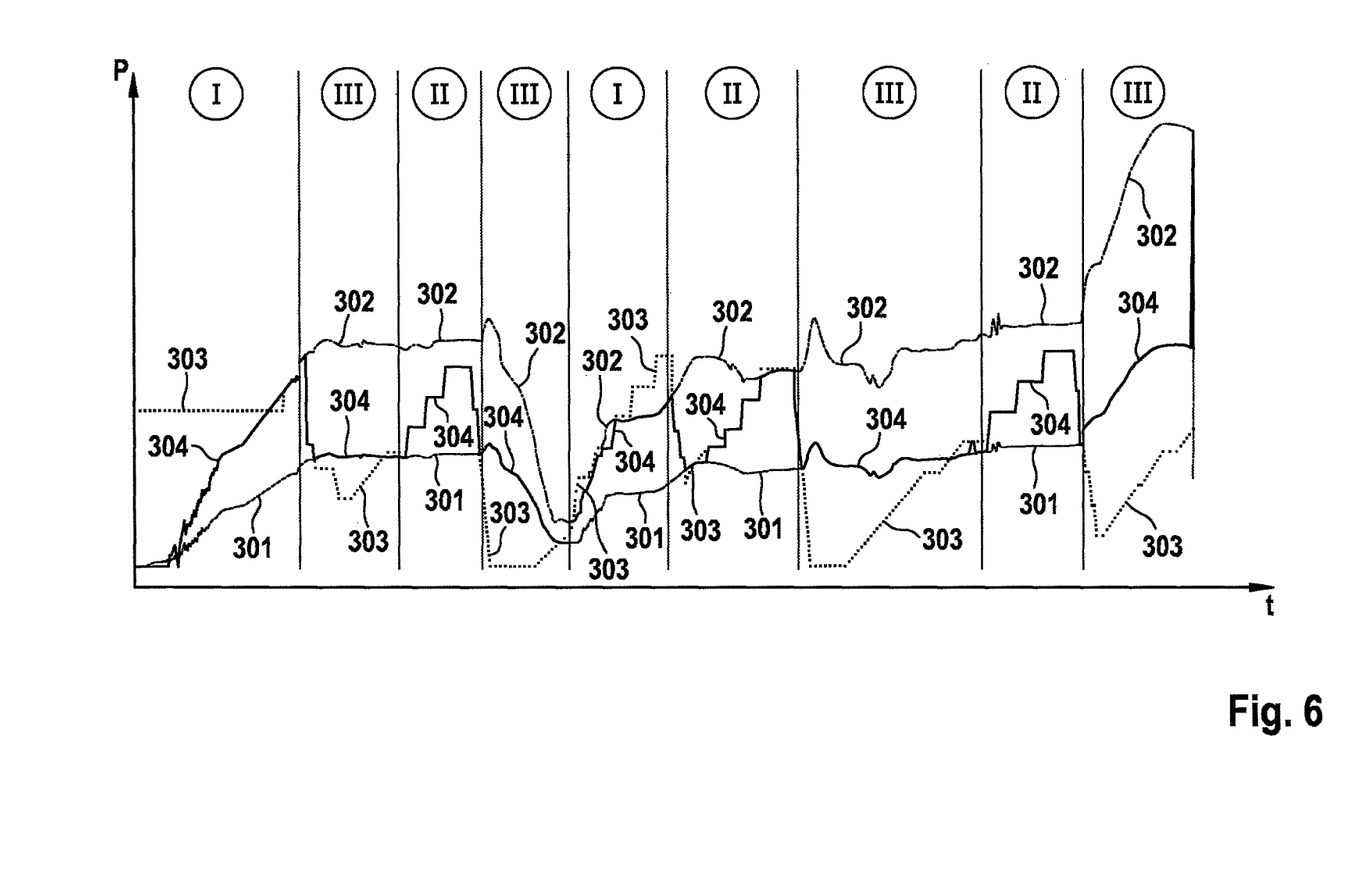
FIG. 6 shows exemplary profiles of different variables during an exemplary method.

FIG. 6 illustrates an exemplary measurement trace of exemplary limited ABS control for driver-imparted braking operations in the fall-back level, with numbering in accordance with the functional sections I, II, III of FIG. 5. Dashed line 301 illustrates the master brake cylinder pressure $P_{HZ}$ (driver pressure request). Dash-dotted line 302 illustrates the pressure $P_{pump}$ (gain pressure request) which is higher by the pressure increase factor. Dotted line 303 illustrates the ABS pressure demand $P_{ABS}$ for the left-hand front wheel (abs pressure request FL). Solid line 304 illustrates the wheel brake pressure of the wheel brake of the left-hand front wheel (pressure FL).

The invention claimed is:

1. A method for operating a brake installation of a motor vehicle having a primary brake system comprising:
a master brake cylinder, which is actuatable by a vehicle driver by brake pedal and which is connected to hydraulically actuatable wheel brakes of a front axle and to hydraulically actuatable wheel brakes of a rear axle,
an electrically controllable pressure provision device which is connected to the wheel brakes of the front axle and the wheel brakes of the rear axle, and
an electrically controllable pressure modulation device for setting wheel-specific brake pressures, having at least one inlet valve for each of the wheel brakes, and having a pump-valve arrangement which is arranged hydraulically between the primary brake system and the wheel brakes of the front axle, wherein the pump-valve arrangement comprises, for each wheel brake of the front axle, a first valve, arranged between the corresponding inlet valve of the primary brake system and the wheel brake, and an electrically activatable pump, with a suction port and a pressure port, wherein the pressure port is connected to the wheel brake, wherein,
in the presence of a predetermined condition of the primary brake system and of an actuation of the master brake cylinder by the vehicle driver,
performing a build-up of wheel brake pressure at the wheel brakes of the front axle by the pump-valve arrangement, wherein the pressure set by the pump-valve arrangement is higher than the brake pressure in the master brake cylinder,
whereas the brake pressure of the master brake cylinder prevails at the wheel brakes of the rear axle.

2. The method as claimed in claim 1, further comprising determining the brake pressure of the master brake cylinder by a first pressure detection device which is arranged in the pump-valve arrangement and which is arranged hydraulically upstream of one of the first valves, and determining the pressure to be set by the pump-valve arrangement by multiplication of the detected brake pressure by a factor higher than one.

3. The method as claimed in claim 1 wherein, in the presence of the predetermined condition of the primary brake system and of the actuation of the master brake cylinder by the vehicle driver, the first valves are closed and the build-up of wheel brake pressure at the wheel brakes of the front axle is performed by the pumps of the pump-valve arrangement, and the wheel brakes of the rear axle are connected to the master brake cylinder.

4. The method as claimed in claim 1, wherein, for each pump, a pressure medium reservoir chamber is provided in the pump-valve arrangement, and for the build-up of the pressure to be set by the pump-valve arrangement, pressure medium is drawn in from the pressure medium reservoir chambers, and conveyed into the wheel brakes of the front axle, by the pumps.

5. The method as claimed in claim 4, wherein the pressure medium reservoir chambers are connected to a pressure medium reservoir tank which is assigned to the master brake cylinder and which is at atmospheric pressure.

6. The method as claimed in claim 1 wherein, for each pump, the suction port of the pump is connected via a third valve, which is in particular designed to be closed when electrically deenergized, to the associated pressure medium reservoir chamber, wherein, for the build-up of the pressure to be set by the pump-valve arrangement, the first valves are closed and the third valves are opened.

7. The method as claimed in claim 4 wherein, for each wheel brake of the front axle, a second valve, which is designed to be closed when electrically deenergized, is provided in the pump-valve arrangement, which valve is arranged in a hydraulic connection between the wheel brake and the pressure medium reservoir chamber, and a dissipation of pressure at one of the wheel brakes of the front axle is performed by virtue of the second valve being opened.

8. The method as claimed in claim 1 wherein, for each wheel brake of the front axle, a second pressure detection device is arranged in the pump-valve arrangement, which second pressure detection device detects the pressure at the wheel brake, and the wheel pressure in the wheel brakes of the front axle is set or adjusted to in a wheel-specific manner on the basis of the second pressure detection devices.

9. The method as claimed in claim 1 wherein, said method is performed for as long as anti-lock control operation is inactive.

10. The method as claimed in claim 1 wherein, in the presence of the predetermined condition of the primary brake system and of the actuation of the master brake cylinder by the vehicle driver, by the pump-valve arrangement, an anti-lock control operation is performed only at the wheel brakes of the front axle, and an ABS pressure demand is predetermined for each of the wheel brakes of the front axle.

11. The method as claimed in claim 10, wherein the pressure at one of the wheel brakes of the front axle is set to the predetermined ABS pressure demand for as long as the ABS pressure demand of the wheel brake is higher than the brake pressure in the master brake cylinder.

12. The method as claimed in claim 11, wherein the pressure set at the wheel brake is always higher, by a predefined amount, than the brake pressure in the master brake cylinder.

13. The method as claimed in claim 10, wherein the pressure at one of the wheel brakes of the front axle is set to the brake pressure in the master brake cylinder if the ABS pressure demand of the wheel brake is lower than the brake pressure in the master brake cylinder.

14. A brake installation for a motor vehicle having a primary brake system comprising:
- a master brake cylinder, which is actuatable by a vehicle driver by a brake pedal and which is connected to hydraulically actuatable wheel brakes of a front axle and to hydraulically actuatable wheel brakes of a rear axle,
- an electrically controllable pressure provision device which is connected to the wheel brakes of the front axle and to the wheel brakes of the rear axle, and
- an electrically controllable pressure modulation device for setting wheel-specific brake pressures, having at least one inlet valve for each wheel brake,
- and having a pump-valve arrangement which is arranged hydraulically between the primary brake system and the wheel brakes of the front axle, wherein
- the pump-valve arrangement comprises, only for each wheel brake of the front axle, a first valve arranged between the corresponding inlet valve of the primary brake system and the wheel brake and an electrically activatable pump with a suction port and a pressure port, wherein the pressure port is connected to the wheel brake, and wherein, in the presence of a predetermined condition of the primary brake system and of an actuation of the master brake cylinder by the vehicle driver, a build-up of wheel brake pressure at the wheel brakes of the front axle is performed by the pump-valve arrangement, wherein the pressure set by the pump-valve arrangement is higher than the brake pressure in the master brake cylinder.

15. The brake installation as claimed in claim 14, wherein, for each pump, a pressure medium reservoir chamber is provided in the pump-valve arrangement, wherein, the pressure medium reservoir chambers are connected via a single tank port of the pump-valve arrangement to a pressure medium reservoir tank which is assigned to the master brake cylinder and which is at atmospheric pressure.

16. The brake installation as claimed in claim 15, wherein, for each pump, the suction port of the pump is connected via a third valve, which is designed to be closed when electrically deenergized, to the associated pressure medium reservoir chamber.

17. The brake installation as claimed in claim 15, wherein the pump-valve arrangement comprises, for each wheel brake of the front axle, a second valve which connects the wheel brake to the pressure medium reservoir chamber and which is designed to be closed when electrically deenergized.

18. A brake installation for a motor vehicle having a primary brake system comprising:
- a master brake cylinder, which is actuatable by a vehicle driver by a brake pedal and which is connected to hydraulically actuatable wheel brakes of a front axle and to hydraulically actuatable wheel brakes of a rear axle,
- an electrically controllable pressure provision device which is connected to the wheel brakes of the front axle and to the wheel brakes of the rear axle, and
- an electrically controllable pressure modulation device for setting wheel-specific brake pressures, having at least one inlet valve for each wheel brake,
- and having a pump-valve arrangement which is arranged hydraulically between the primary brake system and the wheel brakes of the front axle, wherein the pump-valve arrangement comprises, only for each wheel brake of the front axle, a first valve arranged between the corresponding inlet valve of the primary brake system and the wheel brake and an electrically activatable pump with a suction port and a pressure port, wherein the pressure port is connected to the wheel brake, and wherein, in the presence of a predetermined condition of the primary brake system and of an actuation of the master brake cylinder by the vehicle driver, a build-up of wheel brake pressure at the wheel brakes of the front axle is performed by the pump-valve arrangement, wherein the pressure set by the pump-valve arrangement is higher than the brake pressure in the master brake cylinder wherein a second electronic open-loop and closed-loop control unit is provided which is assigned to the pump-valve arrangement and in which a method as claimed in claim 2 is carried out.

* * * * *